US012617875B2

(12) United States Patent (10) Patent No.: US 12,617,875 B2
Uss et al. (45) Date of Patent: May 5, 2026

(54) METHOD FOR PURIFYING A SODIUM ALGINATE POWDER FROM ENDOTOXINS AND ENDOGENOUS PYROGENS

(71) Applicants:Iurii Uss, Moscow (RU); Sergey Yudin, Moscow (RU); Denis Turishchev, Moscow (RU)

(72) Inventors: Iurii Uss, Moscow (RU); Sergey Yudin, Moscow (RU); Denis Turishchev, Moscow (RU)

( * ) Notice: Subject to any disclaimer, the term of this patent is extended or adjusted under 35 U.S.C. 154(b) by 434 days.

(21) Appl. No.: 18/242,688

(22) Filed: Sep. 6, 2023

(65) Prior Publication Data

US 2025/0075010 A1 Mar. 6, 2025

(51) Int. Cl.
 *C08B 37/00* (2006.01)
(52) U.S. Cl.
 CPC ................................. *C08B 37/0084* (2013.01)
(58) Field of Classification Search
 USPC ............................................................ 536/3
 See application file for complete search history.

(56) References Cited

FOREIGN PATENT DOCUMENTS

WO WO-2021098185 A1 * 5/2021 ......... C08B 37/0084

* cited by examiner

*Primary Examiner* — Traviss C McIntosh, III
(74) *Attorney, Agent, or Firm* — Nadya Reingand

(57) ABSTRACT

A method for purifying a sodium alginate powder from endotoxins and endogenous pyrogens is provided. The sodium alginate powder is thermally treated at a temperature selected based on the viscosity of the sodium alginate powder. A suspension is prepared by adding an organic solvent to the sodium alginate powder, whereafter the suspension is mechanically stirred until homogeneous. The organic solvent comprises a mixture of hexane and isopropyl alcohol in a ratio of 0.5:1-2:1. When particles of the sodium alginate powder are sedimented, a liquid dispersed medium is removed from the suspension. The particles of the sodium alginate powder are dried, and a sodium alginate solution is prepared by dissolving the dried particles in pure water. A silver-impregnated activated carbon powder containing 0.01-0.4 wt % silver is added to the sodium alginate solution. The sodium alginate solution is purified by using ultrafiltration first and then lyophilization or spray drying.

6 Claims, No Drawings

METHOD FOR PURIFYING A SODIUM ALGINATE POWDER FROM ENDOTOXINS AND ENDOGENOUS PYROGENS

TECHNICAL FIELD

The present disclosure relates generally to the field of cosmetology and medicine. In particular, the present disclosure relates to method for purifying a sodium alginate powder from endotoxins and endogenous pyrogens.

BACKGROUND

Polysaccharides are important components of brown algae, including alginate, fucoidan, laminaran, etc. Alginates, commonly referred to as sodium alginate, represent a linear copolymer having polysaccharide homopolymer blocks of (1-4)-linked β-D-mannuronate (M) and α-L-guluronate (G) residues. There are three types of structure of their segment chain: M blocks of continuous M units, G blocks of continuous G units, and an MG block formed by alternately connected G and M units. Alginates are also the most representative class of chemical products from algae. For ease of their storage and use, alginates are usually converted during their extraction from brown algae to sodium alginate as the final product. Being the sodium salt of an anionic polysaccharide (alginic acid), sodium alginate has a very wide range of industrial applications due to its inherent physical and chemical properties.

Alginates are widely used due to their rheological properties as well as biocompatibility, biodegradability and lack of toxicity. The ratio of the three types of blocks, i.e., MM, GG and MG, determines the physical properties of alginates-high G alginates have higher gelling properties, while high M blocks have a higher viscosity. The evaluation of the M/G ratio is also fundamental—alginates having a high M/G ratio provide hard non-elastic gels, while alginates having a low M/G ratio provide soft elastic gels. Alginates having a high level of guluronic acid relative to mannuronic acid are most in demand.

In cosmetology, alginates are used to create lines of medical cosmetics adapted to a specific consumer and combining cleansing, nourishing and protective functions. They can be used both as a component of an external agent, and as a separate hydrogel for subcutaneous use. Hydrogels for subcutaneous use maycontain biologically active substances (BAS), drugs and live cell cultures.

In pharmacology, alginates are used as the basis for:

a cellular material in 3D bioprinters (transplantology);

passive and active systems for transdermal and buccal delivery of complex high-molecular drugs (e.g., insulin and other proteins, factors for transgenic therapy);

immobilization of a cellular material (bacterial, yeast, plant and animal cell cultures) for use in the food, pharmaceutical and chemical industries;

creation of biodegradable biopolymers for use in orthopedics;

creation of a bioplatform for oral delivery of drugs sensitive to biotransformation (e.g., insulin) through the gastrointestinal system directly into the lymphatic and circulatory system, bypassing the liver and pancreas;

creation of a bioplatform for encapsulation of biodegradable glucose microsensors and other biochemical markers (for continuous real-time monitoring) of transdermal and subcutaneous types;

protection of cells/tissues during cryopreservation.

However, the widespread use of sodium alginate in medical cosmetology and pharmacology is limited by the requirement of strict control over the content of endotoxin and endogenous pyrogens (peptides) in it. Typically, commercial alginates have endotoxin levels ranging from about 30000 EU/g to about 60000 EU/g. Pharmaceutical compositions for parenteral administration should generally contain no more than 100 EU/g. Therefore, before commercial alginates can be used parenterally, the endotoxin levels must be substantially reduced.

Endotoxins are lipopolysaccharides that are an integral part of the outer membrane of gram-negative bacteria involved, among others, in stabilizing a bacterial cell wall. Although the endotoxins are strongly associated with the bacterial cell wall, they can be released into the environment not only during cell death, but also during their growth and division; in this case, one bacterial cell can contain approximately 2 million lipopolysaccharide molecules. Therefore, the endotoxins are found in all environments where gram-negative bacteria are found. Particularly high concentrations of the endotoxins are observed during the mass death of bacteria in the focus of infection and in the environments of biotechnological production.

Even though the endotoxin itself is chemically inert, when it enters the bloodstream during a generalized bacterial infection, it binds to receptors and cells of the immune system that regulate an inflammatory response. In this case, an excessive release of inflammatory mediators (cytokines) occurs, and a too strong systemic inflammatory response develops, which is characterized by damage to the endothelium of blood vessels, coagulopathy, tissue hypoperfusion, cardiovascular failure, and multiple organ dysfunction.

The general chemical structure of the endotoxins in most bacteria is similar—it contains a polar heteropolysaccharide fragment (O-antigen), internal oligosaccharide and lipid (lipid A) fragments. An endotoxin molecule is negatively charged in the presence of phosphate groups in lipid A and an internal saccharide fragment and has both hydrophilic (O-antigen) and hydrophobic (fatty acids in lipid A) regions. The molecular weight of the endotoxin varies widely from 2.5 kDa (in the absence of O antigen) to 70 kDa (very large O antigen), usually from 10 to 20 kDa.

The endotoxin molecule is very flexible, much more flexible than globular proteins. Another distinctive feature of the endotoxin is the ability to form strong supramolecular structures under the action of hydrophobic interactions between fatty acid residues and the formation of bridges between phosphate groups and divalent cations, in particular, Ca2+ and Mg2+.

Due to the variability of the chemical structures of the endotoxins, which are expressed in various modifications of the O-antigen and internal oligosaccharide, an endotoxin-binding ligand should be characterized by maximum affinity for the most conserved part of the endotoxins, i.e., lipid A. Lipid A, as well as the internal oligosaccharide fragment, which are part of the endotoxins, are phosphorylated, and this causes their negative charge under normal conditions. Therefore, for better binding of the endotoxin, a ligand that has a positive charge and can reduce the solubility of the entire molecule in a solution is required.

The existing techniques for purifying a sodium alginate powder from the endotoxins and endogenous pyrogens suffer from the following disadvantages: uncontrollable losses due to the complex scheme of the whole technological process, difficulty in standardizing the existing technological schemes when scaling them, as well as their dependence on the concentration of the endotoxins and endogenous pyrogens in the original alginate.

SUMMARY

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide a technical solution that allows any commercial alginates to be purified from endotoxins and endogenous pyrogens to a pharmaceutical level.

The objective above is achieved by the features of the independent claim in the appended claims. Further embodiments and examples are apparent from the dependent claims and the detailed description.

According to an aspect, a method for purifying a sodium alginate powder from endotoxins and endogenous pyrogens is provided. The method starts with the step of providing the sodium alginate powder comprising the endotoxins and the endogenous pyrogens. The sodium alginate powder has a viscosity. Then, the method proceeds to the step of subjecting the sodium alginate powder to heat treatment. The heat treatment is performed at a temperature selected based on the viscosity of the sodium alginate powder. Next, the method goes on to the step of preparing a suspension by adding an organic solvent to the sodium alginate powder. The organic solvent comprises a mixture of hexane and isopropyl alcohol in a ratio of 0.5:1-2:1. The resulting suspension comprises a solid dispersed phase in a liquid dispersed medium, with the solid dispersed phase comprising particles of the sodium alginate powder. Further, the method proceeds to the step of mechanically stirring the suspension to a homogeneous state. When the particles of the sodium alginate powder are sedimented in the suspension, the next step of removing the liquid dispersed medium is performed. After that, the method goes on to the step of subjecting the particles of the sodium alginate powder to drying. Subsequently, the method proceeds to the step of preparing a sodium alginate solution by dissolving the dried particles of the solium alginate powder in pure water. Further, the method proceeds to the step of adding a silver-impregnated activated carbon powder to the sodium alginate solution. The silver-impregnated activated carbon powder contains 0.01-0.4 wt % silver. Next, the method goes on to the steps of purifying the sodium alginate solution containing the silver-impregnated activated carbon powder by using ultrafiltration and subjecting the purified sodium alginate solution to lyophilization or spray drying, thereby obtaining the sodium alginate powder purified from the endotoxins and endogenous pyrogens.

The above method can be used for any commercial alginates, regardless of the initial concentration of endotoxins and endogenous pyrogens therein. Additionally, the above method can provide the following advantages:

for the primary purification of the sodium alginate powder, the mixture of hexane and isopropyl alcohol is used, which differ in their polarity, thereby contributing to the efficient extraction of polyphenols and a decrease in the solubility of peptides;

furthermore, the primary purification is carried out in respect of the sodium alginate powder subjected to the heat treatment, which reduces the effect on the physicochemical properties and conformational structure of the original sodium alginate powder (i.e., the method does not change the physicochemical properties and conformational structure of the original sodium alginate powder);

the silver-impregnated activated carbon powder can reduce the solubility of endotoxins due to the formation of an insoluble complex of a phosphate group and silver ions;

furthermore, the use of the silver-impregnated activated carbon powder makes it possible to exclude the contamination of the sodium alginate solution by microorganisms during the purification process;

it is possible to obtain reproducible characteristics of the final product, regardless of the content of the endotoxins and endogenous pyrogens in the original sodium alginate powder;

the content of the endotoxins in the final product does not exceed 40 EU/g (for comparison, the content of the endotoxins in the commercially available alginates is about 100 EU/g);

it is possible to link all steps of the method into one continuous technological chain to eliminate manual manipulations, which reduces the risk of secondary pollution; and it is possible to scale the whole process for any volume of the final product.

In one exemplary embodiment, said heat treatment is performed at a temperature of 60-80° C. for 30-60 minutes. By doing so, it is possible to properly dry the sodium alginate powder, which may have a positive effect on its further treatment and purification.

In one exemplary embodiment, the particles of the sodium alginate powder are dried using forced ventilation at a temperature less than 60° C. for 1-3 hours. By using such forced ventilation, it is possible to dry the particles of the sodium alginate powder more properly and efficiently.

In one exemplary embodiment, the pure water is one of Type I water, Type II water, Type III water. In this embodiment, the dried particles of the sodium alginate powder are dissolved in the pure water at a temperature of 35-80° C. to a final concentration of 0.1-2%. By doing so, it is possible to obtain the optimal sodium alginate solution.

In one exemplary embodiment, the step of adding the silver-impregnated activated carbon powder is performed as follows. At first, the silver-impregnated activated carbon powder is pre-wetted with purified water. Then, the silver-impregnated activated carbon powder is added to the sodium alginate solution in a ratio of 0.1:1-1:1 at a temperature of 35-80° C. After that, the sodium alginate solution containing the silver-impregnated activated carbon powder is mechanically stirred until a uniform color of the sodium alginate solution is obtained. By doing so, it is possible to optimize the process of adding the silver-impregnated activated carbon powder to the sodium alginate solution.

In one exemplary embodiment, said ultrafiltration is performed by successively using a pre-filter and a sterilizing filter. The pre-filter comprises a dual cellulose acetate or polypropylene membrane having a pore size of 1-10 μm, and the sterilizing filter comprises a dual heterogeneous polyethersulfone membrane having a pore size of 0.2 μm. By using these filters, the ultrafiltration may be performed more efficiently.

Other features and advantages of the present disclosure will be apparent upon reading the following detailed description.

DETAILED DESCRIPTION

Various embodiments of the present disclosure are further described in more detail. However, the present disclosure may be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the method disclosed herein may be implemented in practice by using any numbers of the embodiments provided herein. Furthermore, it should be understood that any embodiment of the present disclosure may be implemented using one or more of the features presented in the appended claims.

The word "exemplary" is used herein in the meaning of "used as an illustration". Unless otherwise stated, any embodiment described herein as "exemplary" should not be construed as preferable or having an advantage over other embodiments.

The exemplary embodiments disclosed herein refer to a technical solution that allows any commercial alginates to be purified from endotoxins and endogenous pyrogens to a pharmaceutical level. More specifically, a sodium alginate powder is provided, which is then subjected to heat treatment at a temperature selected based on the viscosity of the sodium alginate powder. Next, a suspension is prepared by adding an organic solvent to the sodium alginate powder, whereafter the suspension is mechanically stirred to a homogeneous state. The organic solvent comprises a mixture of hexane and isopropyl alcohol in a ratio of 0.5:1-2:1. When particles of the sodium alginate powder are sedimented in the suspension, a liquid dispersed medium is removed from the suspension. After that, the particles of the sodium alginate powder are subjected to drying. Subsequently, a sodium alginate solution is prepared by dissolving the dried particles of the sodium alginate powder in pure water. A silver-impregnated activated carbon powder containing 0.01-0.4 wt % silver is further added to the sodium alginate solution. Further, the sodium alginate solution is purified by using ultrafiltration first and then lyophilization or spray drying.

In a preferred embodiment of the above method, the following operational parameters or conditions are fulfilled:
the original sodium alginate powder is thermally treated at a temperature of 60-80° C. for 30-60 minutes;
the particles of the sodium alginate powder are dried using forced ventilation at a temperature less than 60° C. for 1-3 hours;
the pure water is one of Type I water, Type II water, Type III water; and the dried particles of the sodium alginate powder are dissolved in the pure water at a temperature of 35-80° C. to a final concentration of 0.1-2%;
the silver-impregnated activated carbon powder is added as follows: i) the silver-impregnated activated carbon powder is pre-wetted with purified water, ii) the silver-impregnated activated carbon powder is added to the sodium alginate solution in a ratio of 0.1:1-1:1 at a temperature of 35-80° C., and (iii) the sodium alginate solution containing the silver-impregnated activated carbon powder is mechanically stirred until a uniform color of the sodium alginate solution is obtained; and said ultrafiltration is performed by successively using a pre-filter and a sterilizing filter, with the pre-filter comprising a dual cellulose acetate or polypropylene membrane having a pore size of 1-10 μm and the sterilizing filter comprising a dual heterogeneous polyethersulfone membrane having a pore size of 0.2 μm.

Some implementation examples of the method will be numerically described below, which however should not be construed as any limitation of the present disclosure. Instead, these examples are given to demonstrate the feasibility of the method and explain some of its aspects in more detail.

Example 1

1. 1 kg of a commercial sodium alginate powder was taken and heated at 60° C. for 60 minutes.
2. A mixture of hexane and isopropyl alcohol (ratio 1:1) was added to the cooled sodium alginate powder in a volume ratio of 0.5:1. The resulting suspension was mechanically stirred for 10 minutes to a homogeneous state and then settled until a two-phase system was formed. The upper (liquid) phase was removed.
3. After that, the sodium alginate powder was dried using forced ventilation at a temperature not exceeding 60° C. for 1 hour.
4. The dried sodium alginate powder was dissolved in pure water (e.g., Type I, Type II, or Type Ill pure water) at a temperature of 45° C. to a final concentration of 1%.
5. In the resulting 1% sodium alginate solution at a temperature of 45° C., a silver-impregnated activated carbon powder (with 0.3 wt % silver), previously moistened with purified water, was added in a ratio of 1:0.5. The whole solution was stirred mechanically until a uniform color was obtained.
6. The 1% sodium alginate solution with the silver-impregnated activated carbon powder at a temperature of 45° C. was purified by pressure sterile ultrafiltration with successive use of a pre-filter (based on glass fiber with a double membrane made of polypropylene with a pore size of 5 μm) and a sterilizing filter (with a double heterogeneous membrane made of PES (polyethersulfone)—pre-filter 0.8 μm and final filter 0.2 μm).
7. The purified sterile sodium alginate solution was dried by sterile vacuum freeze drying.

Example 2

1. 1 kg of a commercial sodium alginate powder was taken and heated at 70° C. for 30 minutes.
2. A mixture of hexane and isopropyl alcohol (2:1 ratio) was added to the cooled sodium alginate powder in a 1:1 volume ratio. The resulting suspension was mechanically stirred for 5 minutes to a homogeneous state and settled until a two-phase system was formed. The upper (liquid) phase was removed.
3. Then, the sodium alginate powder was dried using forced ventilation at a temperature not exceeding 60° C. for 1 hour.
4. The dried sodium alginate powder was dissolved in pure water (e.g., Type I, Type II, or Type Ill pure water) at a temperature of 50° C. to a final concentration of 1.5%.

5. In the resulting 1.5% sodium alginate solution at a temperature of 50° C., a silver-impregnated activated carbon powder (with 0.2 wt % silver), previously moistened with purified water, was added in a ratio of 1:0.4. The mixture was stirred mechanically until a uniform color was obtained.

6. The 1.5% sodium alginate solution with the silver-impregnated activated carbon powder at a temperature of 50° C. was purified by pressure sterile ultrafiltration with the successive use of a pre-filter (based on glass fiber with a double membrane made of polypropylene with a pore size of 10 μm) and a sterilizing filter (with a double heterogeneous membrane from PES (polyethersulfone)—pre-filter 0.8 μm and final filter 0.2 μm).

7. The purified sterile sodium alginate solution was dried by sterile vacuum freeze drying.

Example 3

1. 1 kg of a commercial sodium alginate powder was taken and heated at 60° C. for 60 minutes.

2. A mixture of hexane and isopropyl alcohol (ratio 1:1) was added to the cooled sodium alginate powder in a volume ratio of 0.5:1. The resulting suspension was mechanically stirred for 5 minutes to a homogeneous state and settled until a two-phase system was formed. The upper (liquid) phase was removed.

3. Then, the sodium alginate powder was dried using forced ventilation at a temperature not exceeding 60° C. for 1 hour.

4. The dried sodium alginate powder was dissolved in pure water (e.g., Type I, Type II, or Type III pure water) at a temperature of 60° C. to a final concentration of 2%.

5. In the resulting 2% sodium alginate solution at a temperature of 60° C., a silver-impregnated activated carbon powder (with 0.4 wt % silver), previously moistened with purified water, was added in a ratio of 1:0.5. The mixture was stirred mechanically until a uniform color was obtained.

6. The 2% sodium alginate solution with the silver-impregnated activated carbon powder at a temperature of 60° C. was purified by pressure sterile ultrafiltration with successive use of a pre-filter (based on glass fiber with a double membrane made of polypropylene with a pore size of 5 μm) and a sterilizing filter (with a double heterogeneous membrane made of PES (polyethersulfone)—pre-filter 0.8 μm and final filter 0.2 μm).

7. The purified sterile sodium alginate solution was dried using the sterile spray drying method.

Example 4

1. 1 kg of a commercial sodium alginate powder was taken and heated at 70° C. for 30 minutes.

2. A mixture of hexane and isopropyl alcohol (1:1 ratio) in a 1:1 volume ratio was added to the cooled sodium alginate powder. The resulting suspension was mechanically stirred for 6 minutes to a homogeneous state and settled until a two-phase system was formed. The upper (liquid) phase was removed.

3. Then, the sodium alginate powder was dried using forced ventilation at a temperature not exceeding 60° C. for 1 hour.

4. The dried sodium alginate powder was dissolved in pure water (e.g., Type I, Type II, or Type III pure water) at a temperature of 55° C. to a final concentration of 1%.

5. In the resulting 1% sodium alginate solution at a temperature of 55° C., a silver-impregnated activated carbon powder (with 0.3 wt % silver), previously moistened with purified water, was added in a ratio of 1:0.5. The mixture was stirred mechanically until a uniform color was obtained.

6. The 1% sodium alginate solution with the silver-impregnated activated carbon powder at a temperature of 55° C. was purified by pressure sterile ultrafiltration with successive use of a pre-filter (based on glass fiber with a double membrane made of polypropylene with a pore size of 10 μm) and a sterilizing filter (with a double heterogeneous membrane made of PES (polyethersulfone)—pre-filter 0.8 μm and final filter 0.2 μm).

7. The purified sterile sodium alginate solution was dried using the sterile spray drying method.

Example 5

1. 1 kg of a commercial sodium alginate powder was taken and heated at 60° C. for 60 minutes.

2. A mixture of hexane and isopropyl alcohol (1:1 ratio) in a 2:1 volume ratio was added to the cooled sodium alginate powder. The resulting suspension was mechanically stirred for 10 minutes to a homogeneous state and settled until a two-phase system was formed. The upper (liquid) phase was removed.

3. Then, the sodium alginate powder was dried using forced ventilation at a temperature not exceeding 60° C. for 1 hour.

4. The dried sodium alginate powder was dissolved in pure water (e.g., Type I, Type II, or Type III pure water) at a temperature of 45° C. to a final concentration of 1%.

5. In the resulting 1% sodium alginate solution at a temperature of 45° C., a silver-impregnated activated carbon powder (with 0.4 wt % silver), previously moistened with purified water, was added in a ratio of 1:1. The mixture was stirred mechanically until a uniform color was obtained.

6. The 1% sodium alginate solution with the silver-impregnated activated carbon powder at a temperature of 45° C. was purified by pressure sterile ultrafiltration with successive use of a pre-filter (based on glass fiber with a double membrane made of polypropylene with a pore size of 10 μm) and a sterilizing filter (with a double heterogeneous membrane made of PES (polyethersulfone)—pre-filter 0.8 μm and final filter 0.2 μm).

7. The purified sterile sodium alginate solution was dried by sterile vacuum freeze drying.

Example 6

1. 1 kg of a commercial sodium alginate powder was taken and heated at 60° C. for 60 minutes.

2. A mixture of hexane and isopropyl alcohol (1:1 ratio) in a 2:1 volume ratio was added to the cooled sodium alginate powder. The resulting suspension was mechanically stirred for 10 minutes to a homogeneous state and settled until a two-phase system was formed. The upper (liquid) phase was removed.

3. Then, the sodium alginate powder was dried using forced ventilation at a temperature not exceeding 60° C. for 1 hour.

4. The dried sodium alginate powder was dissolved in pure water (e.g., Type I, Type II, Type III pure water) at a temperature of 70° C. to a final concentration of 2%.

5. In the resulting 2% sodium alginate solution at a temperature of 70° C., a silver-impregnated activated carbon powder (with 0.4 wt % silver), previously moistened with purified water, was added in a ratio of 1:1. The mixture was stirred mechanically until a uniform color was obtained.

6. The 2% sodium alginate solution with the silver-impregnated activated carbon powder at a temperature of 70° C. was purified by pressure sterile ultrafiltration with successive use of a pre-filter (based on glass fiber with a double membrane made of polypropylene with a pore size of 5 μm) and a sterilizing filter (with a double heterogeneous membrane made of PES (polyethersulfone)—pre-filter 0.8 μm and final filter 0.2 μm).

7. The purified sterile sodium alginate solution was dried by sterile vacuum freeze drying.

Example 7

1. 1 kg of a commercial sodium alginate powder was taken and heated at 70° C. for 30 minutes.

2. A mixture of hexane and isopropyl alcohol (ratio 1:1) was added to the cooled sodium alginate powder in a volume ratio of 0.5:1. The resulting suspension was mechanically stirred for 10 minutes to a homogeneous state and settled until a two-phase system was formed. The upper (liquid) phase was removed.

3. Then, the sodium alginate powder was dried using forced ventilation at a temperature not exceeding 60° C. for 1 hour.

4. The dried sodium alginate powder was dissolved in pure water (e.g., Type I, Type II, Type III pure water) at a temperature of 65° C. to a final concentration of 1.5%.

5. In the resulting 1.5% sodium alginate solution at a temperature of 65° C., a silver-impregnated activated carbon powder (with 0.4 wt % silver), previously moistened with purified water, was added in a ratio of 1:0.4. The mixture was stirred mechanically until a uniform color was obtained.

6. The 1.5% sodium alginate solution with the silver-impregnated activated carbon powder at a temperature of 65° C. was purified by pressure sterile ultrafiltration with the successive use of a pre-filter (based on glass fiber with a double membrane made of polypropylene with a pore size of 10 μm) and a sterilizing filter (with a double heterogeneous membrane from PES (polyethersulfone)—pre-filter 0.8 μm and final filter 0.2 μm).

7. The purified sterile sodium alginate solution was dried using the sterile spray drying method.

Table 1 given below shows endotoxin levels in the purified sodium alginate powders from Examples 1-7. The endotoxin levels were measured by using the well-known Limulus Amebocyte Lysate (LAL) test.

TABLE 1

| | Endotoxin levels in the sodium alginate powders from Examples 1-7 | |
| --- | --- | --- |
| | Endotoxin level EU/g | |
| Example | before purification | after purification |
| 1 | 48430 | 29.1 |
| 2 | 47900 | 30.4 |
| 3 | 51200 | 31.7 |
| 4 | 37670 | 26.8 |
| 5 | 58700 | 33.9 |
| 6 | 26890 | 24.3 |
| 7 | 34650 | 27.6 |

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements, steps or operations, and the indefinite article "a" or "an" does not exclude a plurality. The mere fact that certain measures are recited in mutually different dependent claims does not indicate that a combination of these measures cannot be used to advantage.

The invention claimed is:

1. A method for purifying a sodium alginate powder from endotoxins and endogenous pyrogens, comprising:

providing the sodium alginate powder comprising the endotoxins and the endogenous pyrogens, the sodium alginate powder having a viscosity;

subjecting the sodium alginate powder to heat treatment, the heat treatment being performed at a temperature selected based on the viscosity of the sodium alginate powder;

preparing a suspension by adding an organic solvent to the sodium alginate powder, the organic solvent comprising a mixture of hexane and isopropyl alcohol in a ratio of 0.5:1-2:1, the suspension comprising a solid dispersed phase in a liquid dispersed medium, the solid dispersed phase comprising particles of the sodium alginate powder;

mechanically stirring the suspension to a homogeneous state;

when the particles of the sodium alginate powder are sedimented in the suspension, removing the liquid dispersed medium;

subjecting the particles of the sodium alginate powder to drying;

preparing a sodium alginate solution by dissolving the dried particles of the sodium alginate powder in pure water;

adding a silver-impregnated activated carbon powder to the sodium alginate solution, the silver-impregnated activated carbon powder containing 0.01-0.4 wt % silver;

purifying the sodium alginate solution containing the silver-impregnated activated carbon powder by using ultrafiltration; and subjecting the purified sodium alginate solution to lyophilization or spray drying, thereby obtaining the sodium alginate powder purified from the endotoxins and endogenous pyrogens.

2. The method of claim 1, wherein the heat treatment is performed at a temperature of 60-80° C. for 30-60 minutes.

3. The method of claim 1, wherein the particles of the sodium alginate powder are dried using forced ventilation at a temperature less than 60° C. for 1-3 hours.

4. The method of claim 1, wherein the pure water is one of Type I water, Type II water, Type III water, and wherein the dried particles of the sodium alginate powder are dissolved in the pure water at a temperature of 35-80° C. to a final concentration of 0.1-2%.

5. The method of claim 1, wherein said adding of the silver-impregnated activated carbon to the sodium alginate solution comprises:

pre-wetting the silver-impregnated activated carbon powder with purified water;

adding the silver-impregnated activated carbon powder to the sodium alginate solution in a ratio of 0.1:1-1:1 at a temperature of 35-80° C.; and mechanically stirring the sodium alginate solution containing the silver-impregnated activated carbon powder until a uniform color of the sodium alginate solution is obtained.

6. The method of claim 1, wherein said ultrafiltration is performed by successively using a pre-filter and a sterilizing filter, the pre-filter comprising a dual cellulose acetate or polypropylene membrane having a pore size of 1-10 µm, and the sterilizing filter comprising a dual heterogeneous polyethersulfone membrane having a pore size of 0.2 µm.

\* \* \* \* \*